United States Patent
Choi et al.

(10) Patent No.: US 10,146,413 B2
(45) Date of Patent: Dec. 4, 2018

(54) METHOD AND APPARATUS FOR DISPLAYING SCREEN IN ELECTRONIC DEVICES

(71) Applicant: Samsung Electronics Co., Ltd., Suwon-si, Gyeonggi-do (KR)

(72) Inventors: Kibong Choi, Suwon-si (KR); Geonsoo Kim, Suwon-si (KR); Yongjoon Jeon, Hwaseong-si (KR); Wonsuk Lee, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 14/818,889

(22) Filed: Aug. 5, 2015

(65) Prior Publication Data

US 2016/0041727 A1     Feb. 11, 2016

(30) Foreign Application Priority Data

Aug. 7, 2014   (KR) .................. 10-2014-0101486

(51) Int. Cl.
*G06F 3/0481*   (2013.01)
*G06F 3/0484*   (2013.01)
*G06F 3/048*    (2013.01)
*G06T 11/60*    (2006.01)

(52) U.S. Cl.
CPC .......... *G06F 3/04842* (2013.01); *G06F 3/048* (2013.01); *G06F 3/0481* (2013.01); *G06F 3/04817* (2013.01); *G06T 11/60* (2013.01)

(58) Field of Classification Search
CPC .... G06F 3/04842; G06F 3/048; G06F 3/0481; G06F 3/04817
See application file for complete search history.

(56) References Cited

U.S. PATENT DOCUMENTS

| | | | |
|---|---|---|---|
| 7,064,759 B1 | 6/2006 | Feierbach et al. | |
| 7,640,511 B1 * | 12/2009 | Keel | G06Q 10/10 707/999.003 |
| 7,796,139 B1 | 9/2010 | Feierbach et al. | |
| 8,359,541 B1 | 1/2013 | Landry | |
| 2006/0077266 A1 | 4/2006 | Nurmi | |
| 2008/0094421 A1 | 4/2008 | Maeda | |
| 2009/0262139 A1 | 10/2009 | Tanaka et al. | |
| 2013/0080950 A1 * | 3/2013 | Alford, Jr. | G06F 3/04817 715/765 |
| 2013/0103665 A1 | 4/2013 | Kasterstein et al. | |
| 2013/0167065 A1 | 6/2013 | Chen et al. | |
| 2014/0240580 A1 | 8/2014 | Lee et al. | |

FOREIGN PATENT DOCUMENTS

| | | |
|---|---|---|
| JP | 2013-092988 A | 5/2013 |
| KR | 10-1050555 B1 | 7/2011 |

* cited by examiner

*Primary Examiner* — Omar R Abdul-Ali
(74) *Attorney, Agent, or Firm* — Jefferson IP Law, LLP

(57) ABSTRACT

A method for displaying images so that a lower graphical user interface (GUI) object and an upper GUI object do not overlap each other in a specific area in a screen of an electronic device is provided. The displaying method includes detecting a non-overlapping area in a lower GUI object, determining whether upper GUI objects are displayed to overlap the non-overlapping area, and if the upper GUI objects are displayed to overlap the non-overlapping area at least in part, changing a display configuration of at least one of the GUI objects.

20 Claims, 15 Drawing Sheets

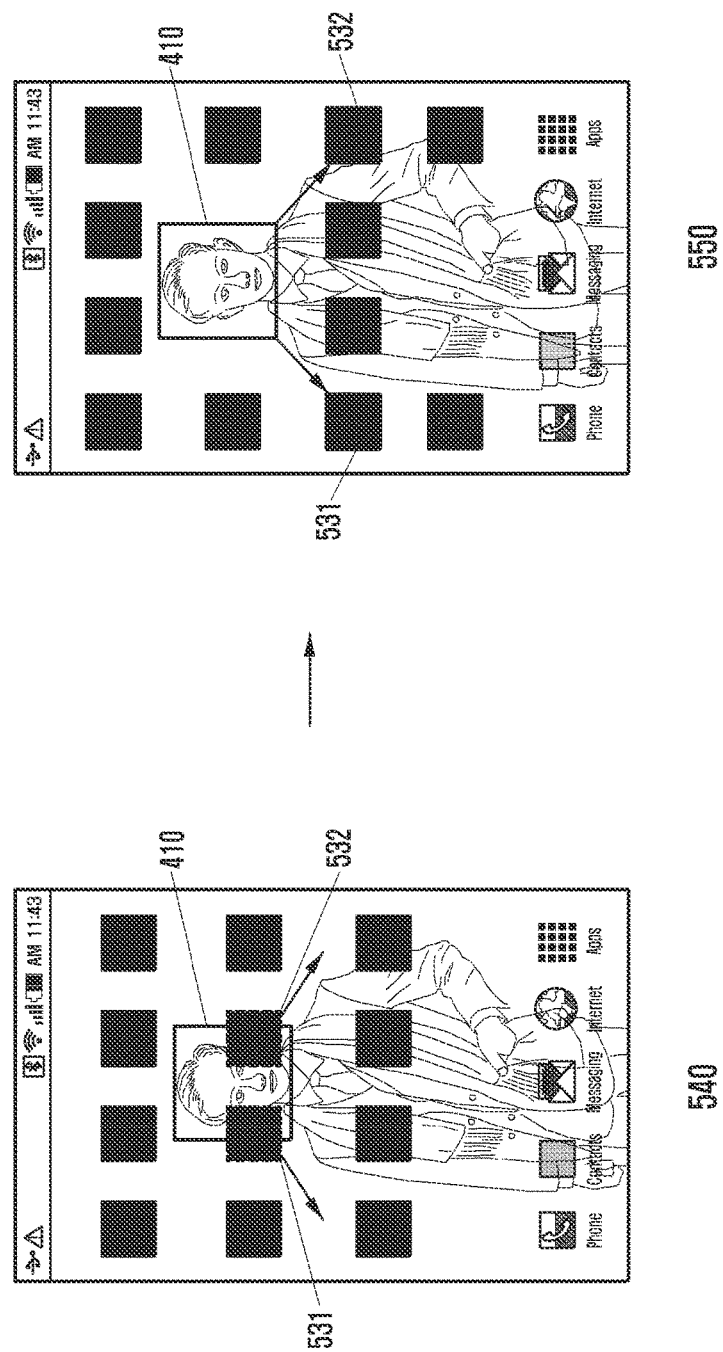

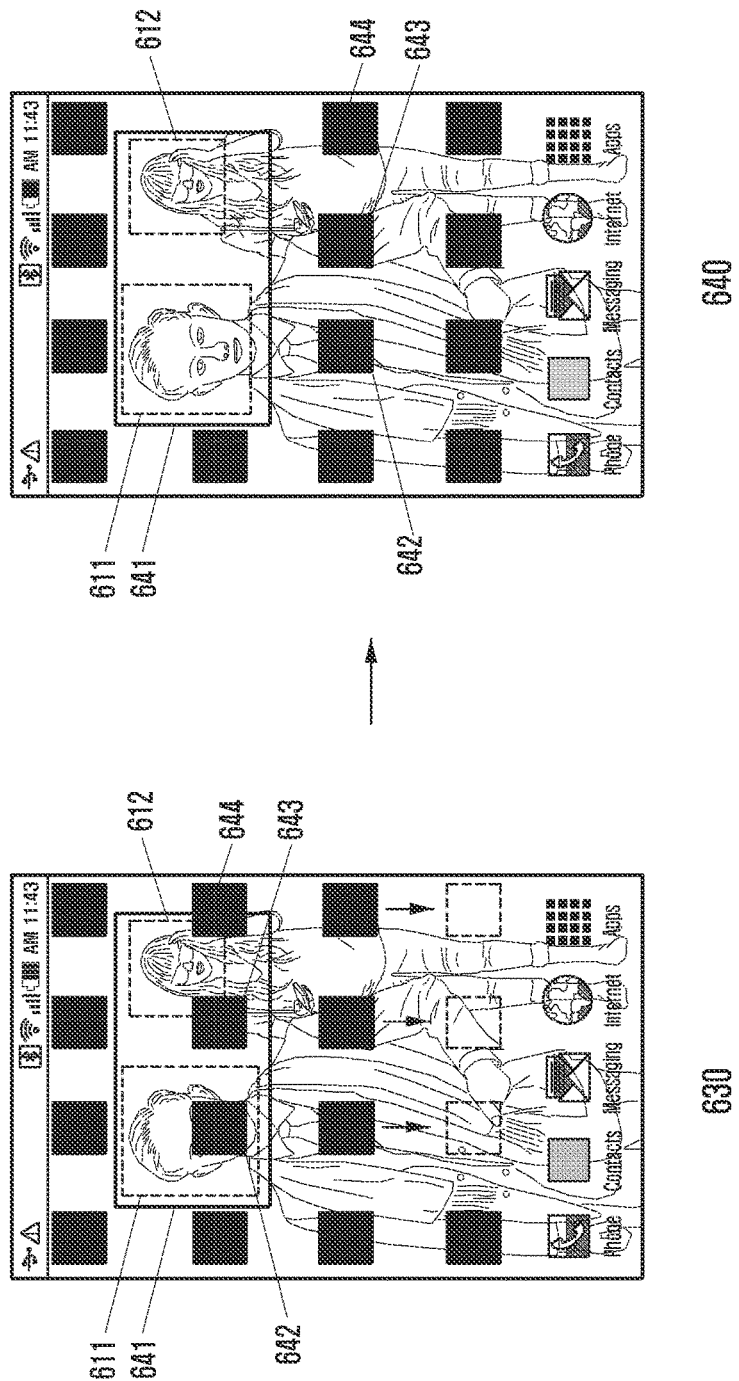

METHOD AND APPARATUS FOR DISPLAYING SCREEN IN ELECTRONIC DEVICES

CROSS-REFERENCE TO RELATED APPLICATION(S)

This application claims the benefit under 35 U.S.C. § 119(a) of a Korean patent application filed on Aug. 7, 2014 in the Korean Intellectual Property Office and assigned Serial number 10-2014-0101486, the entire disclosure of which is hereby incorporated by reference.

TECHNICAL FIELD

The present disclosure relates to a method for displaying graphical user interface (GUI) objects in an electronic device. More particularly, the present disclosure relates to a method for detecting a non-overlapping area where the GUI objects that are configured to be displayed in the lower layer by the user (hereinafter, referred to as lower GUI objects), and the GUI objects that are configured to be displayed in the upper layer (hereinafter, referred to as upper GUI objects) do not overlap each other.

BACKGROUND

An electronic device may display various graphical user interface (GUI) objects in a screen when the electronic device is turned on. The GUI objects may be comprised of mobile objects, such as icons, or widgets, and fixed objects, such as a background image. In addition, the GUI objects displayed in the electronic device may be transformed in various ways. For example, the background image of the electronic device may be selected from among illustrated images, and photos of people, objects, or scenes, which are photographed by the electronic device.

The graphical user interface (GUI) objects of the electronic device may be divided into mobile objects and fixed objects. Similarly, the GUI objects may be divided into objects, which are displayed in the upper layer, and objects, which are displayed in the lower layer. At this time, the GUI objects displayed in the upper layer, for example, may be widgets or icons of the electronic device, and the GUI objects displayed in the lower layer may be background images. As mentioned above, the GUI objects may be displayed in the upper layer or the lower layer, so the objects displayed in the upper layer may cover the objects in the lower layer in part. For example, a specific icon may cover a person's face displayed in the background image. In this case, it is inconvenient for a user to use the electronic device while primary items, such as the background image, of the GUI objects displayed in the lower layer are covered. Furthermore, the user should directly relocate the GUI objects, such as widgets or icons, displayed in the upper layer in order to display the primary objects in the screen, which could be tiresome.

Therefore, a need exists for an apparatus and method for detecting a non-overlapping area where the GUI objects that are configured to be displayed in the lower layer by the user, and the GUI objects that are configured to be displayed in the upper layer do not overlap each other.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for detecting a non-overlapping area where the GUI objects that are configured to be displayed in the lower layer by the user, and the GUI objects that are configured to be displayed in the upper layer do not overlap each other. In addition, according to various embodiments of the present disclosure, if the upper GUI objects are displayed to overlap the non-overlapping area at least in part, the upper GUI object may be relocated to the outside of the area. If icons exist in the area, the icons may be relocated outside the area. Alternatively, various embodiments of the present disclosure can adjust the position or the size of the background image so that the area does not overlap the position of the icon.

In accordance with an aspect of the present disclosure, a displaying method is provided. The displaying method includes detecting a non-overlapping area in a lower GUI object, determining whether upper GUI objects are displayed to overlap the non-overlapping area, and changing, if the upper GUI objects are displayed to overlap the non-overlapping area at least in part, a display configuration of at least one of the GUI objects.

In accordance with another aspect of the present disclosure, an electronic device is provided. The electronic device includes a display unit configured to display a lower GUI object and upper GUI objects, and a controller configured to detect a non-overlapping area from the lower GUI object, determine whether the upper GUI objects are displayed to overlap the non-overlapping area, and to change, if the upper GUI objects are displayed to overlap the non-overlapping area at least in part, a display configuration of at least one of the GUI objects.

Various embodiments of the present disclosure can configure a specific area where the lower GUI objects (e.g., background images, background videos, or application execution images, such as a browser) configured in the screen, and the upper GUI objects, such as icons or widgets, do not overlap each other, and if the GUI objects overlap each other in the non-overlapping area, the display configuration of at least one GUI object may be changed. According to this, the various embodiments of the present disclosure can display the GUI objects more effectively in the screen, and can enhance the usability of background images, such as photos.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, 5C, and 5D illustrate an operation of relocating upper GUI objects according to an embodiment of the present disclosure;

FIGS. 6A and 6B illustrate an operation of displaying images in a case of a plurality of non-overlapping areas according to an embodiment of the present disclosure;

Throughout the drawings, it should be noted that like reference numbers are used to depict the same or similar elements, features, and structures.

DETAILED DESCRIPTION

Figure 1:
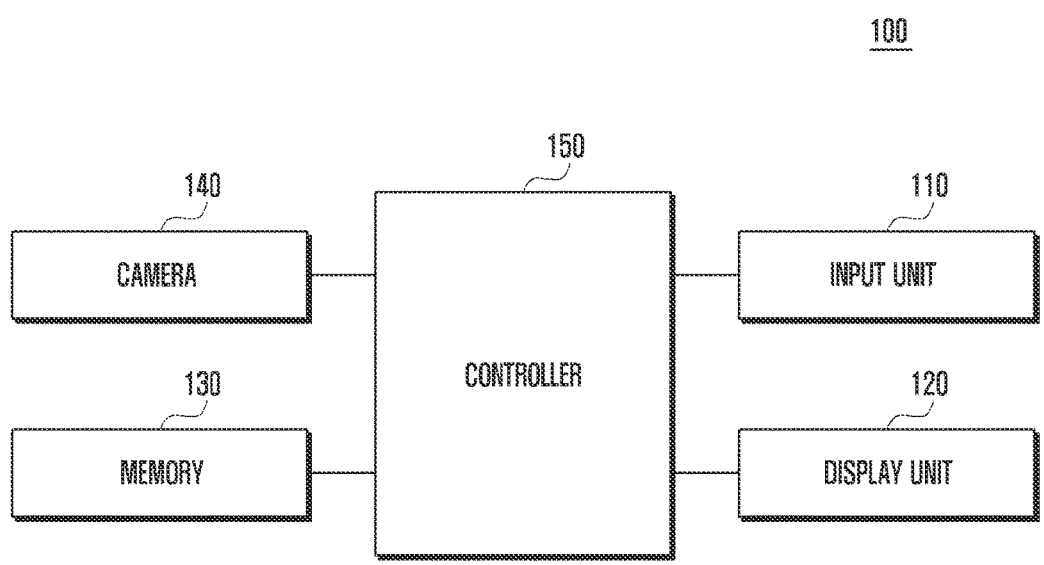
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In embodiments of the present disclosure, the expression "include" or "may include" refers to existence of a corresponding function, operation, or element, and does not limit one or more additional functions, operations, or elements. In an embodiment of the present disclosure, the terms such as "include" and/or "have" may be construed to denote a certain characteristic, number, operation, constituent element, element or a combination thereof, but may not be construed to exclude the existence of or a possibility of addition of one or more other characteristics, numbers, operations, constituent elements, elements or combinations thereof.

In an embodiment of the present disclosure, the expression "or" includes any or all combinations of words enumerated together. For example, the expression "A or B" may include A, may include B, or may include both A and B.

In an embodiment of the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

The terms used in an embodiment of the present disclosure are only used to describe specific embodiments, and are not intended to limit the present disclosure.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in embodiments of the present disclosure.

An electronic device according to the present disclosure may be a device including a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group (MPEG-1 or MPEG-2) audio layer 3 (MP3) player, a mobile medical device, a camera, a wearable device (e.g., a head-mounted-device (HMD), such as electronic glasses, electronic clothes, an electronic bracelet, an electronic necklace, an electronic appcessory, an electronic tattoo, a smart watch, and the like).

According to some embodiments of the present disclosure, the electronic device may be a smart home appliance with a finger print function. The smart home appliance as an example of the electronic device may include at least one of, for example, a television (TV), a digital video disc (DVD)

player, an audio, a refrigerator, an air conditioner, a vacuum cleaner, an oven, a microwave oven, a washing machine, an air cleaner, a set-top box, a TV box (e.g., Samsung Home-Sync™, Apple TV™, or Google TV™), a game console, an electronic dictionary, an electronic key, a camcorder, and an electronic picture frame.

According to some embodiments of the present disclosure, the electronic device may include at least one of various medical appliances (e.g., magnetic resonance angiography (MRA), magnetic resonance imaging (MRI), computed tomography (CT) machine, and an ultrasonic machine), navigation devices, global positioning system (GPS) receivers, event data recorders (EDRs), flight data recorders (FDRs), automotive infotainment devices, a multiple of electronic equipment for ships (e.g., a multiple of navigation equipment for ships, gyrocompasses, and the like), avionics, security devices, head units for vehicles, industrial or home robots, automatic teller machines (ATM) of banking facilities, and point of sales (POSs) of shops.

According to another embodiment of the present disclosure, the electronic devices may include at least one of furniture or a part of a building/structure having a communication function, electronic boards, electronic signature receiving devices, projectors, or various measuring equipment (e.g., an equipment for a water supply, an electricity, gases or radio waves). The electronic device according to an embodiment of the present disclosure may be a combination of one or more of the aforementioned various devices. In addition, the electronic device according to an embodiment of the present disclosure may be a flexible device. Further, it is obvious to those skilled in the art that the electronic device according to the present disclosure is not limited to the aforementioned devices.

Hereinafter, an electronic device according to various embodiments will be described with reference to the accompanying drawings. The term "user" used in various embodiments may refer to a person who uses an electronic device or a device (e.g., an artificial intelligence electronic device) that uses an electronic device.

Prior to the description, the terms "overlapping area," and "non-overlapping area" will be described in the present specification. The "non-overlapping area" may refer to the area where certain visual items are displayed not to overlap each other. The "non-overlapping area" may be the area where the graphical user interface (GUI) objects (e.g., background images, background videos, or application execution images, such as a browser) displayed in the lower layer (hereinafter, referred to as lower GUI objects), and the GUI objects (e.g., widgets, icons, and the like) displayed in the upper layer (hereinafter, referred to as upper GUI objects) do not overlap each other. In addition, the non-overlapping area may be configured to include specific objects (e.g., a person's face) in the background image in order not to be covered by the upper GUI objects, such as icons or widgets, by the user. Furthermore, the non-overlapping area may be configured to include various items, such as things, animals, text, and the like, according to the user's setup.

Now, the configuration of the electronic device, according to various embodiments of the present disclosure, will be described with reference to FIG. 1.

FIG. 1 is a block diagram of the electronic device according to an embodiment of the present disclosure.

Referring to FIG. 1, an electronic device 100, according to an embodiment of the present disclosure, may include an input unit 110, a display unit 120, a memory 130, a camera 140, and a controller 150.

The input unit 110 detects user inputs. The input unit 110 may detect touch inputs of the user and a touch device through a touch sensor. In addition, the input unit 110 may detect other inputs through additional devices (e.g., cameras, sensors, hardware keys, accessories, and the like) in addition to the touch input. Furthermore, the input unit 110 may detect inputs through context awareness elements, such as positions, time, and the like. In creating the non-overlapping area according to the user's setup, the input unit 110, according to an embodiment of the present disclosure, may detect a touch or an input through the additional devices, which are necessary for the creation of the non-overlapping area, to thereby transfer the same to the controller 150.

The display unit 120 may be formed of a liquid crystal display (LCD), an organic light-emitting diode (OLED), an active matrix OLED (AMOLED), and the like, and may provide visual information, such as menus of portable terminals, input data, or function setup information, to the user. The display unit 120, according to an embodiment of the present disclosure, may display an image including the non-overlapping area, and a plurality of upper GUI objects in the background image. For example, the display unit 120 may relocate the upper GUI objects to the area rather than the non-overlapping area to be thereby displayed according to the control of the controller 150. In addition, the display unit 120 may change the configuration of the background image (e.g., reduction in the size of the background image) to be displayed, under the control of the controller 150, so that the disposed upper GUI objects and the non-overlapping area do not overlap each other. In addition, even when moving the background image, the display unit 120 may display the upper GUI objects in the area except for the non-overlapping area so that the upper GUI objects do not overlap the non-overlapping area.

The memory 130 may store instructions or data received from the controller 150 or other elements, or created by the controller 150 or other elements. The memory 130, according to an embodiment of the present disclosure, may store image data to be used for the background images. In addition, the memory 130 may store information on the non-overlapping area in the image data. At this time, the information on the non-overlapping area may be included in exchangeable image file format (EXIF) information to be managed. The non-overlapping area may be newly created by combining two or more non-overlapping areas under the control of the controller 150. In this case, the memory 130 may store the data on the newly created non-overlapping area as well. In addition, the memory 130 may store image information on the upper GUI objects. Furthermore, the memory 130 may store information corresponding to icons (e.g., the execution frequency of a corresponding application) among the upper GUI objects, and may store the data on the priority for deletion, which is created based on the frequency.

The camera 140, under the control of the controller 150, may photograph objects to thereby output the date thereof to the controller 150. The camera 140, according to an embodiment of the present disclosure, may photograph images or videos to be used for the lower GUI object. In addition, the camera 140 may perform the function of recognizing a person's face when photographing the images. In the case of photographing a person according to the function above, the camera 140 may focus on the face area for taking a photo, and may configure a tag for the face image to be thereby stored. When the photographed image is configured as the background image, the tag configured with respect to the face image may be used as the non-overlapping area. However, the non-overlapping area is not limited to the area including the face image. The non-overlapping area may be defined as the area including various images, such as things, animals, characters, and the like. When photographing images using the camera 140, the user may configure the non-overlapping area within a desired range for the object as he or she likes.

The controller 150 may control overall operations of the electronic device.

The controller 150, according to an embodiment of the present disclosure, may determine whether the lower GUI object to be displayed in the background image includes non-overlapping area information. In addition, if the lower GUI object has the data including the non-overlapping area information, the controller 150 may recognize the position of the non-overlapping area. Furthermore, the controller 150 may determine whether the upper GUI objects are displayed to overlap the non-overlapping area at least in part. If it is determined that the upper GUI objects are displayed to overlap the non-overlapping area at least in part, the controller 150 may perform the operation by which the non-overlapping area and the upper GUI objects do not overlap each other. At this time, the operation for displaying the non-overlapping area and the upper GUI objects not to overlap each other may be performed through a method for changing the configuration of the lower GUI object and a method for changing the configuration of the upper GUI object. When the upper GUI objects overlap the non-overlapping area at least in part, the controller 150 may change the configuration of the lower GUI object to be thereby displayed. For example, the controller 150 may reduce both the size of the lower GUI object and the size of the non-overlapping area so that the upper GUI objects are displayed not to overlap the non-overlapping area. In addition, in the case where the upper GUI objects are displayed densely in the screen, the controller 150 may create an additional empty page that is comprised of only the lower GUI object without the upper GUI objects. Furthermore, the controller 150 may change the positions of the background image and the non-overlapping area included therein to be thereby displayed.

When the upper GUI objects are displayed to overlap the non-overlapping area at least in part, the controller 150, according to an embodiment of the present disclosure, may change the configuration of the upper GUI object. For example, when the upper GUI objects are detected within the non-overlapping area, the controller 150 may change the positions of the upper GUI objects to be displayed. The upper GUI objects may be relocated in a position outside the non-overlapping area. In addition, when it is detected that the upper GUI object exists in the non-overlapping area, the controller 150 may change (e.g., reduce) the size of the upper GUI object, and may display the same in the outside of the non-overlapping area. In addition, the controller 150 may group the upper GUI objects (e.g., icons) displayed to overlap the non-overlapping area into a folder, and may display the same outside the non-overlapping area. For example, if the upper GUI objects included in the folder are icons, the icons included in the same folder may be configured according to the properties of the application corresponding to each icon. For example, the upper GUI objects included in the folder may be grouped into the folder, based on the category of a corresponding application (e.g., games, finance, social networking services (SNSs), and the like), or the properties of a corresponding application, such as the capacity, the name, and the creation date there. Furthermore, the upper GUI objects (e.g., icons) may be made into the folder, based on the external properties, such as the shape or the color of the image.

Hereinafter, the operation of the present disclosure will be described with reference to FIGS. 2 to 7C.

Figure 2:
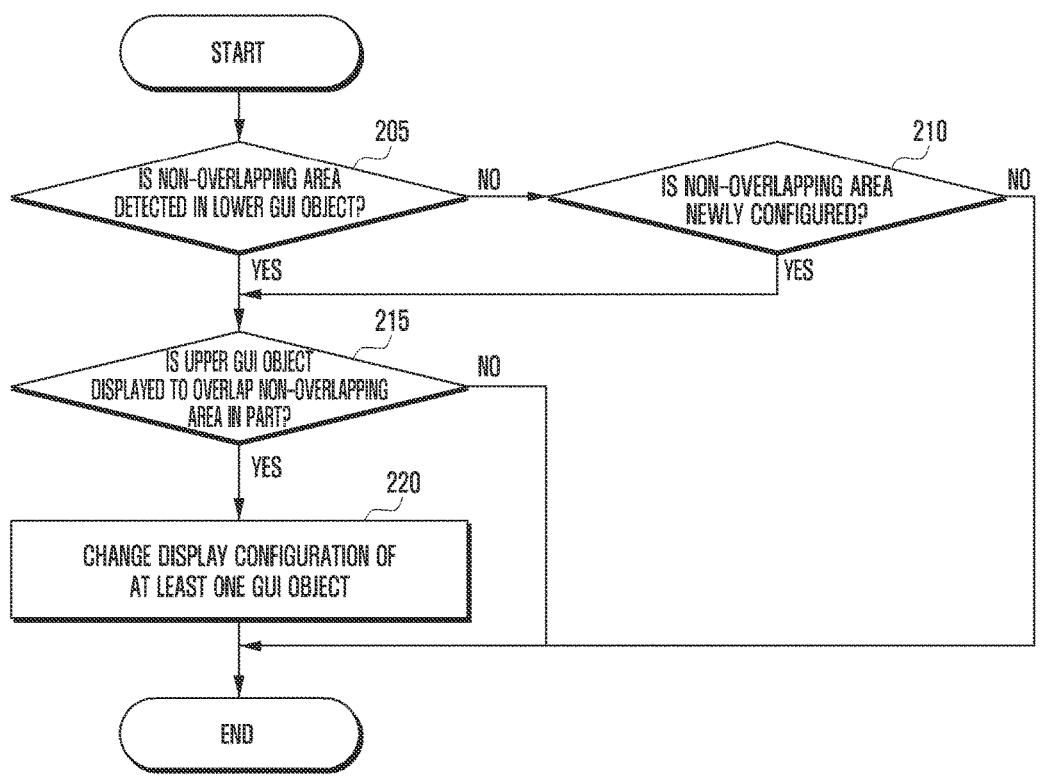
FIG. 2 is a flowchart illustrating an upper graphical user interface (GUI) objects being displayed to overlap a non-overlapping area in an electronic device according to an embodiment of the present disclosure.

FIG. 2 is a flowchart illustrating an upper GUI objects being displayed to overlap a non-overlapping area in an electronic device according to an embodiment of the present disclosure.

Figure 3:
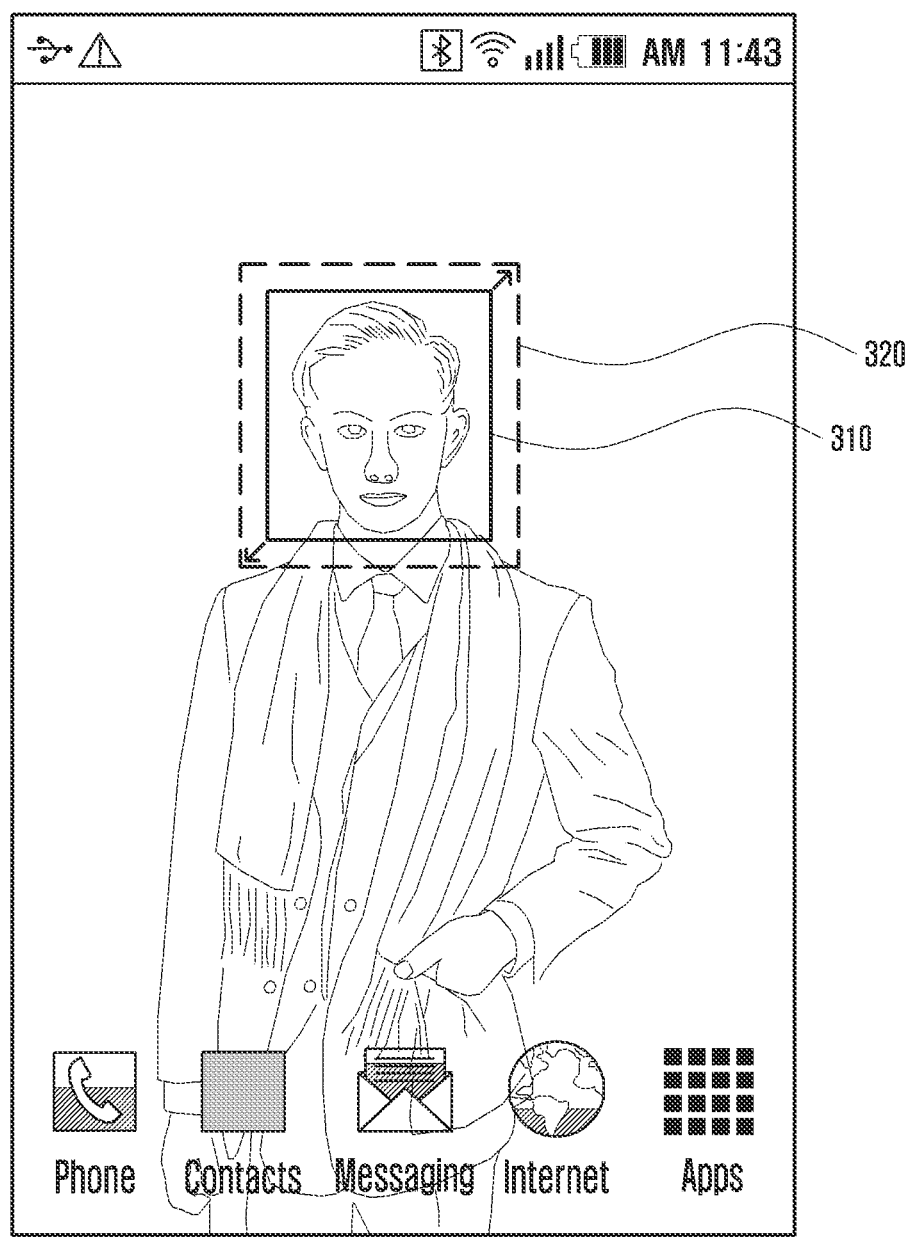
FIG. 3 illustrates an operation of detecting a non-overlapping area in an electronic device according to an embodiment of the present disclosure.

FIG. 3 illustrates an operation of detecting a non-overlapping area in an electronic device according to an embodiment of the present disclosure.

Figure 4:
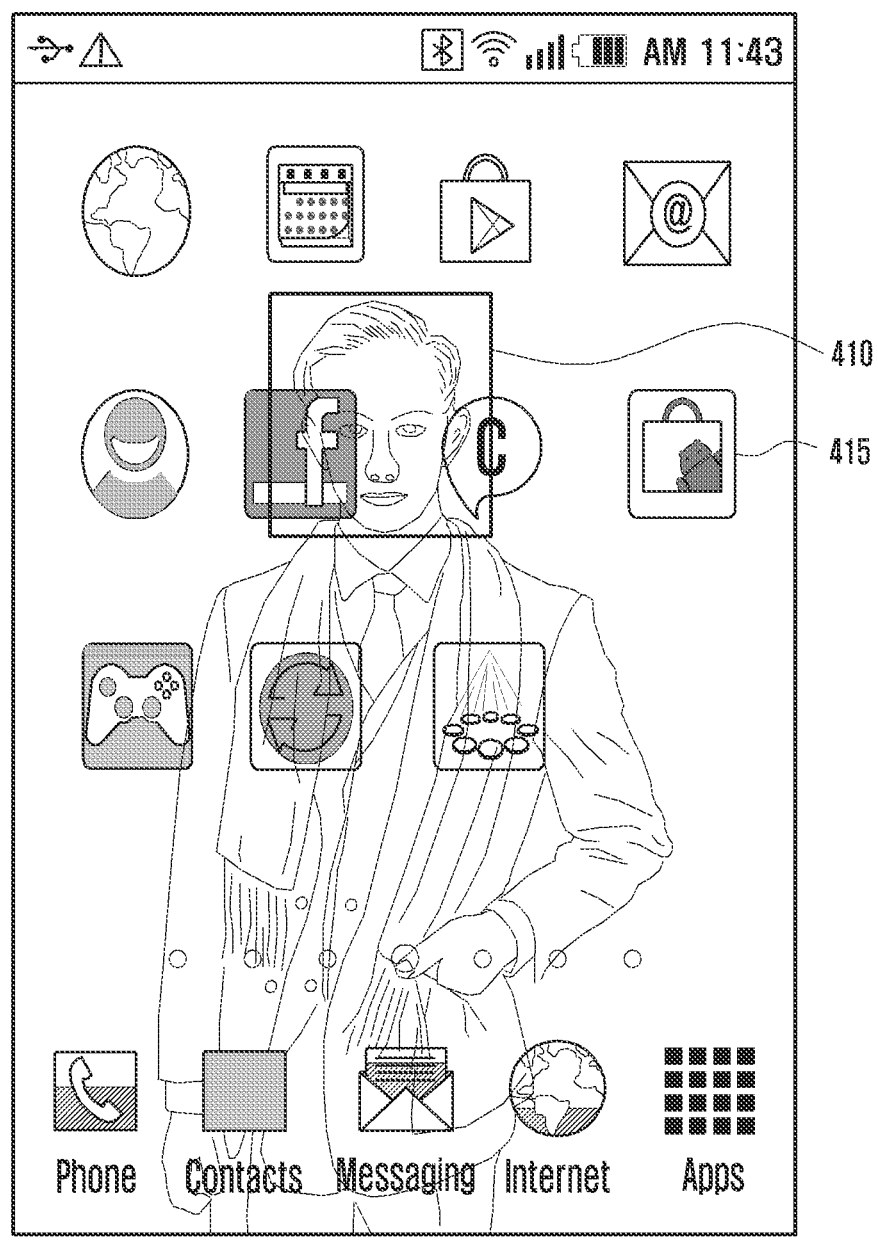
FIG. 4 illustrates an operation of detecting that a non-overlapping area and upper GUI objects overlap each other at least in part in an electronic device according to an embodiment of the present disclosure.

FIG. 4 illustrates an operation of detecting that a non-overlapping area and upper GUI objects overlap each other at least in part in an electronic device according to an embodiment of the present disclosure.

FIGS. 5A, 5B, 5C, and 5D illustrate an operation of relocating upper GUI objects according to an embodiment of the present disclosure.

Figure 6A:
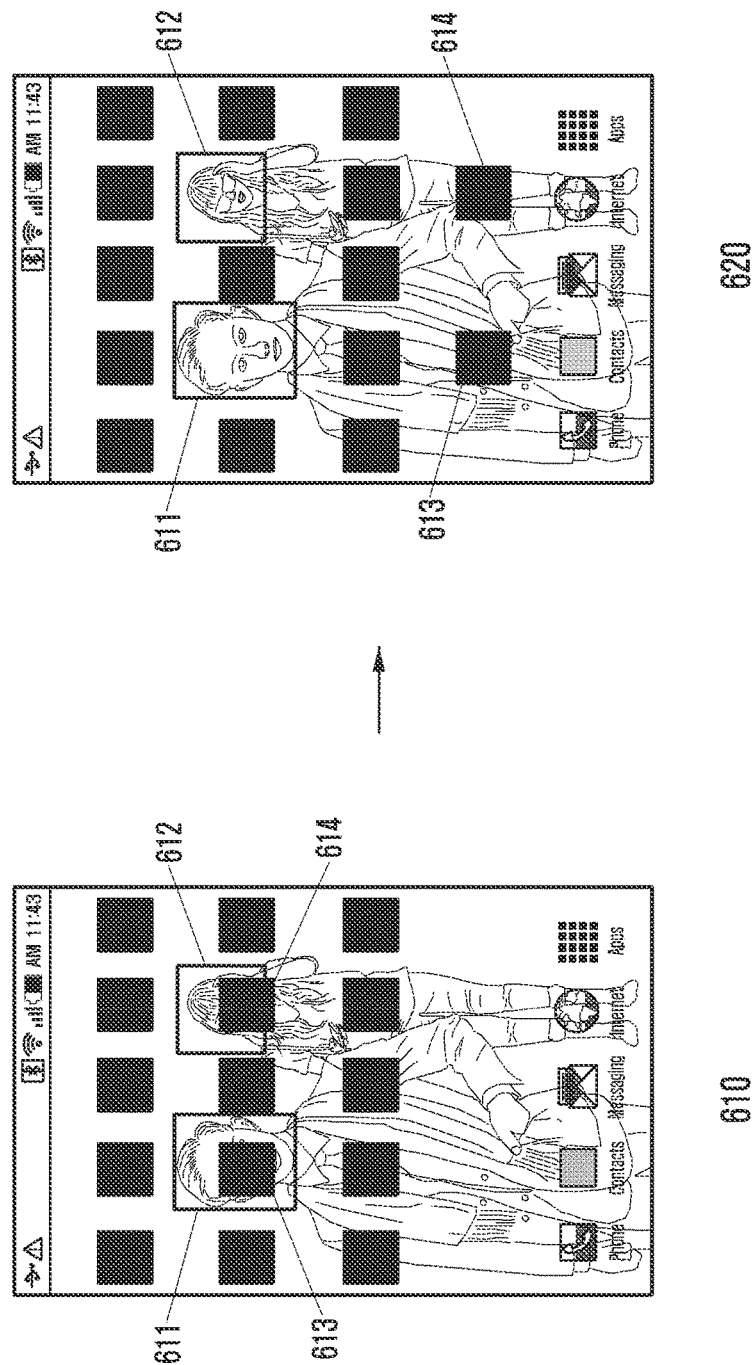

FIGS. 6A and 6B illustrate an operation of displaying images in a case of a plurality of non-overlapping areas according to an embodiment of the present disclosure.

Figure 7A:
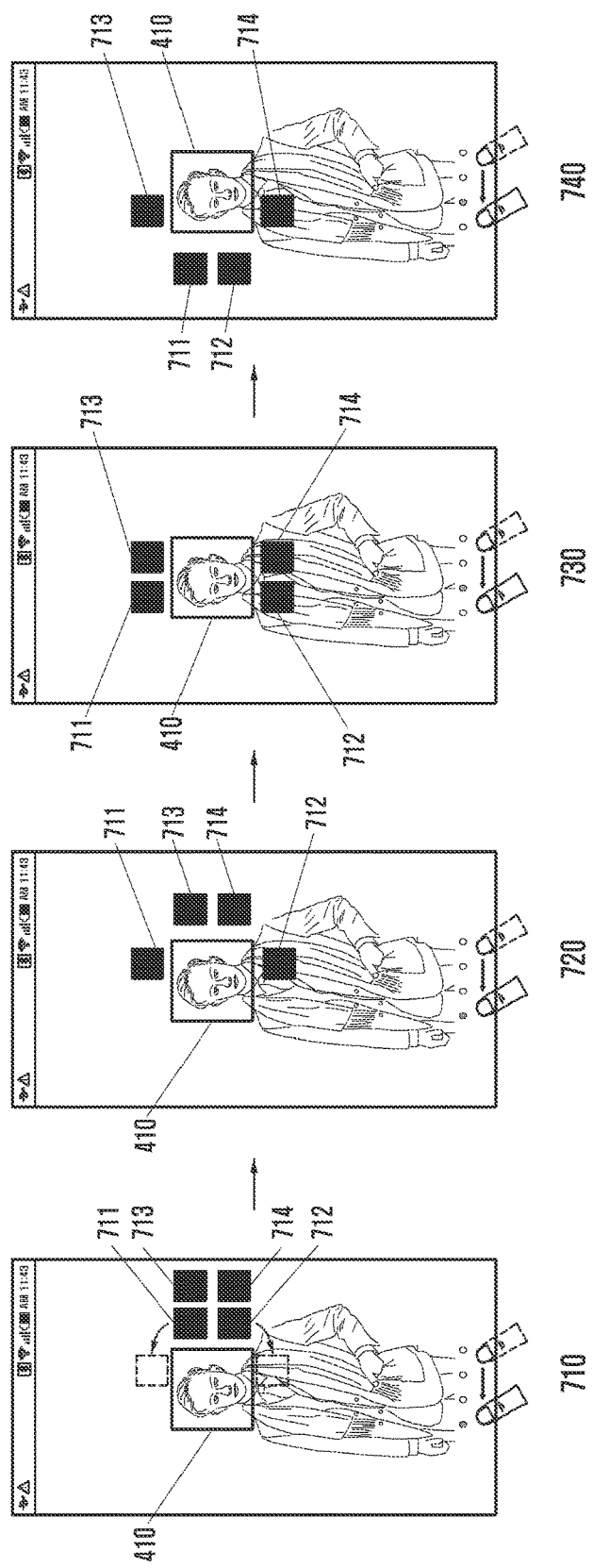
FIGS. 7A and 7B illustrate an operation of displaying images when moving on between background image pages according to an embodiment of the present disclosure.
Figure 7B:
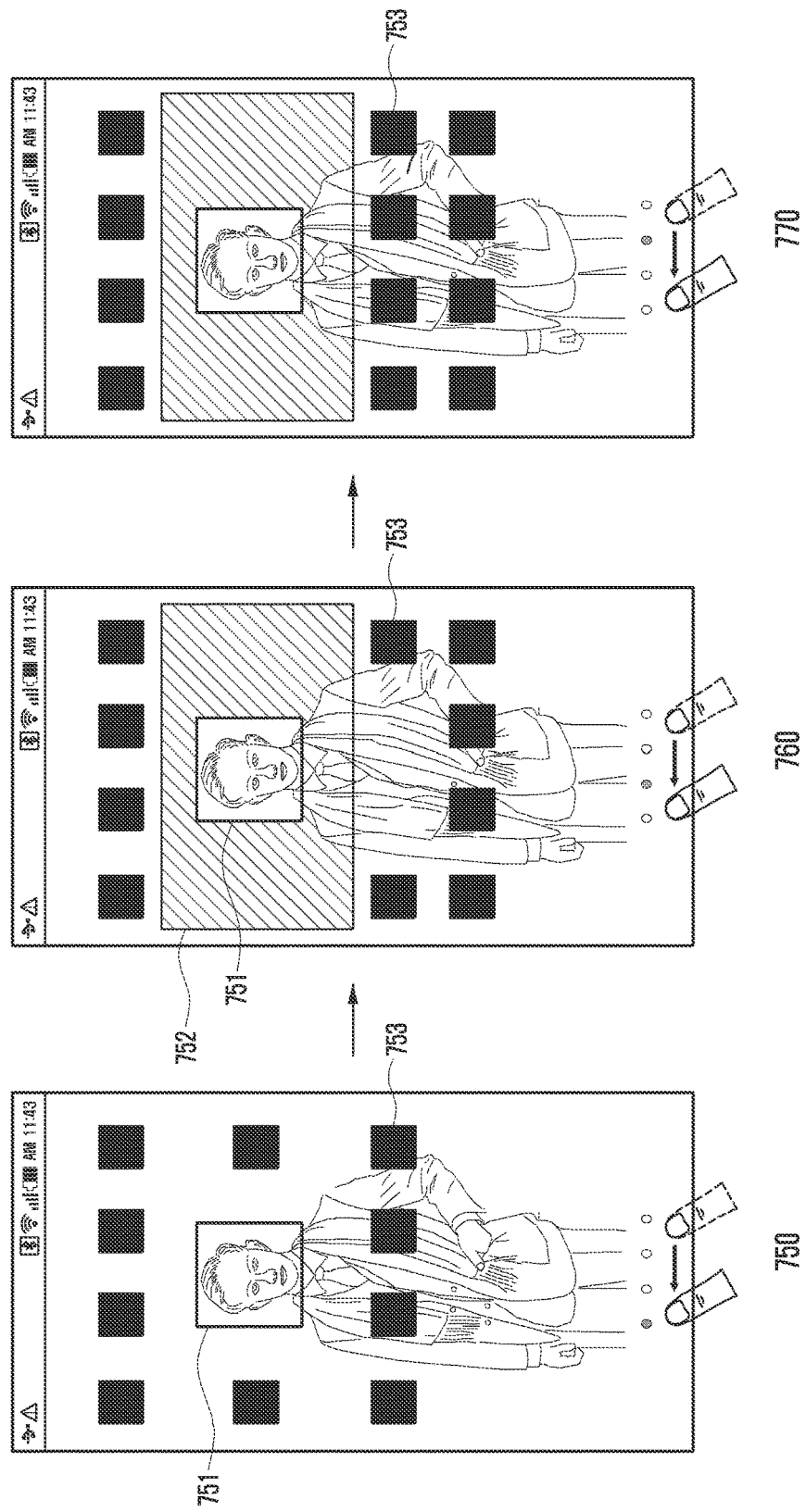

FIGS. 7A and 7B illustrate an operation of displaying images when moving on between background image pages according to an embodiment of the present disclosure.

Figure 7C:
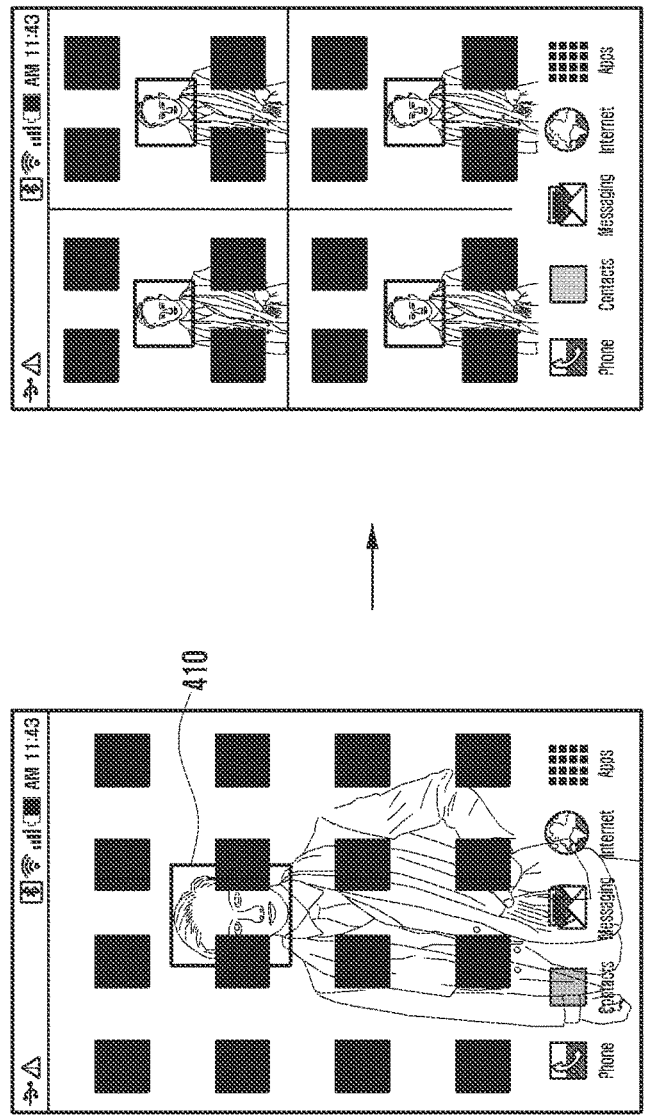
FIG. 7C illustrates an operation of changing a display configuration of a lower GUI object according to an embodiment of the present disclosure.

FIG. 7C illustrates an operation of changing a display configuration of a lower GUI object according to an embodiment of the present disclosure.

Referring to FIG. 2, the controller 150 may determine whether the non-overlapping area is detected in the background image in operation 205. At this time, the non-overlapping area may be configured at the time of creating the image. For example, when the camera 140 photographs the image using a face detecting function, the photographed image may include information in which the detected face is configured as the object. As mentioned above, a specific image may include information on the non-overlapping area when the specific image is created. Accordingly, the controller 150 may recognize whether the background image has the information on the non-overlapping area in operation 205. If the controller 150 cannot detect the non-overlapping area from the background image, the non-overlapping area may be newly configured in operation 210. Although it is described that the operation 210 is performed only when the controller 150 cannot detect the non-overlapping area in FIG. 2, even when the non-overlapping area is detected, the controller 150 may configure a new non-overlapping area according to the user's request. For example, the controller 150 may configure an additional non-overlapping area according to the user's request in addition to the detected non-overlapping area, and may increase or reduce the range of the existing non-overlapping area.

The detailed description about the function above will be made with reference to FIG. 3. FIG. 3 illustrates that a person's image is displayed in the screen of the electronic device. The controller 150 may detect the area where the person's face is displayed in FIG. 3 as the non-overlapping area 310. In addition, in the case of configuring a new non-overlapping area, the non-overlapping area may be configured in a certain area. In addition, the controller 150 may extend the detected non-overlapping area 310 to thereby make a new non-overlapping area 320.

If the controller 150 does not configure a new non-overlapping area on the lower GUI objects where the non-overlapping area is not detected, the operation of FIG. 2 may be terminated. On the contrary, if the non-overlapping area is detected in the background image in operation 205, or if a non-overlapping area is newly configured in operation 210, the controller 150 may perform operation 215. The controller 150 may determine whether the upper GUI objects are detected at least in a part of the non-overlapping area in operation 215. If the controller 150 cannot detect the upper GUI objects displayed to overlap the non-overlapping area at least in part, the operation of FIG. 2 may be terminated. Meanwhile, if the upper GUI objects displayed to overlap the non-overlapping area at least in part are detected in operation 215, the controller 150 may perform operation 220.

The detailed description about the upper GUI objects displayed to overlap the non-overlapping area at least in part, in operation 215 will be made with reference to FIG. 4. FIG. 4 illustrates that a person's image is displayed as the lower GUI object. In addition, the face area of the person's image is configured as the non-overlapping area 410 in the lower GUI object. In addition, a plurality of upper GUI objects 415 are displayed on the lower GUI object. In addition, some of the upper GUI objects 415 are displayed to overlap the non-overlapping area 410 at least in part in the screen. In the case where some of the upper GUI objects 415 are displayed to overlap the non-overlapping area 410, the controller 150 may detect the same.

When the controller 150 detects the upper GUI objects displayed to overlap the non-overlapping area at least in part, the controller 150 may change the display configuration of at least one of the upper GUI objects or the lower GUI object in operation 220.

First, the operation of relocating the upper GUI objects will be described with reference to FIGS. 5A, 5B, 5C, 5D, 6A, and 6B.

FIGS. 5A, 5B, 5C, and 5D illustrate the operation of relocating the upper GUI objects. FIGS. 6A and 6B illustrate the displaying operation in the screen in the case of a plurality of non-overlapping areas.

Figure 5A:
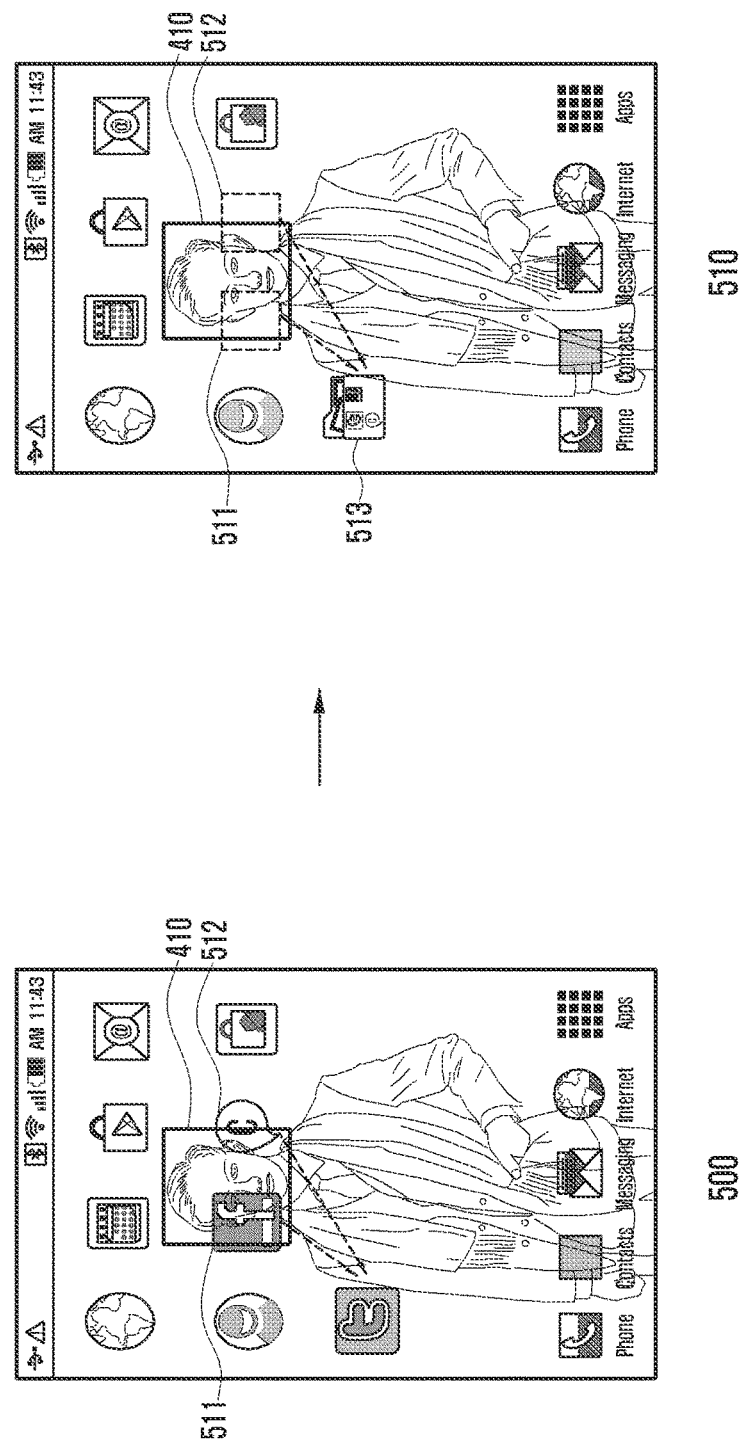

Referring to FIGS. 5A, 5B, 5C, and 5D, according to an embodiment of the present disclosure, diagram 500 of FIG. 5A illustrates that the upper GUI objects 511 and 512 are displayed to overlap the non-overlapping area 410 in part. In this case, the upper GUI objects 511 and 512 may be relocated to a position outside the non-overlapping area 410. According to an embodiment of the present disclosure, diagram 510 illustrates a folder located outside of the non-overlapping area 410, which is formed by grouping the existing upper GUI objects. In making a folder as the method for relocating the upper GUI objects, the controller 150 may make a folder according to the properties information (e.g., image properties information) of each of the upper GUI objects, or the properties information of the application (e.g., usage frequency, category, creation date, and the like) related to the upper GUI object. Diagram 510 of FIG. 5A illustrates that the folder 513 is created by the upper GUI objects of the applications that belong to the same category. According to the embodiment of the present disclosure, the controller 150 may recognize that the upper GUI objects 511 and 512 displayed to overlap the non-overlapping area 410 belong to the same category, i.e., a SNS, and may combine the upper GUI objects 511 and 512 with the upper GUI objects that belong to the SNS category to create the folder 513. The information on the upper GUI object category may be identified according to the properties information of the application related to the upper GUI object. The properties information of the application may include category information (e.g., games, SNS, finance, shopping, and the like), and information, such as the capacity, the creation date, the color, the location, the usage frequency, or the sorting priority of the application, as well as the name and a file size thereof. For example, the controller 150 may make the folder 513 comprised of the objects that are not frequently used according to the usage frequency of the upper GUI objects 511 and 512.

Figure 5B:
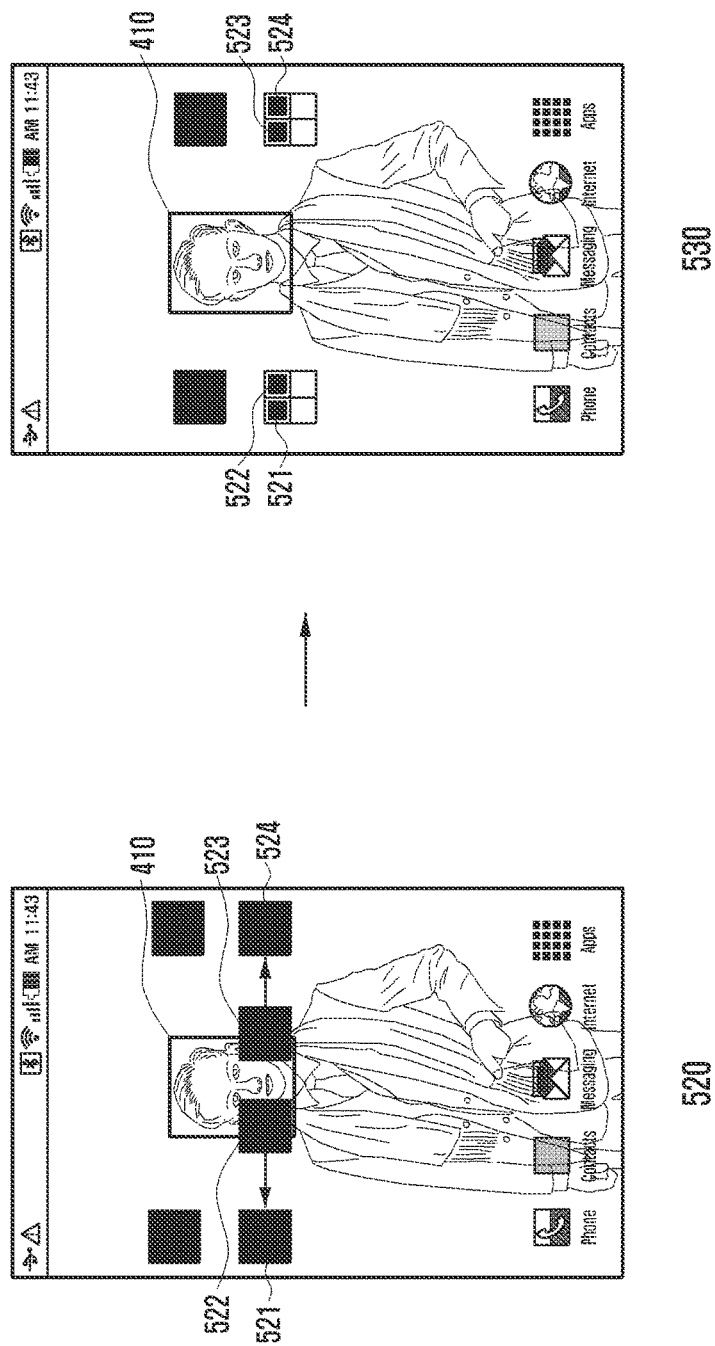

In addition, according to an embodiment of the present disclosure, FIG. 5B illustrates that the icons are changed in the size and relocated outside the non-overlapping area. Diagram 520 of the FIG. 5B illustrates the icons 522 and 523 displayed to overlap the non-overlapping area 410. In relocating the icons 522 and 523, the controller 150 may reduce the sizes of the icons 522 and 523. At this time, in relocating the icons 522 and 523 outside the non-overlapping area 410, the controller 150 may reduce the sizes of other icons 521 and 524 near the relocated area. Accordingly, as shown in diagram 530, the controller 150 may display the size-changed icon 521, which has been on the left side of the non-overlapping area 410, together with the size-changed icon 522, which has belonged to the non-overlapping area 410, in the outer left side of the non-overlapping area 410. Similarly, the controller 150 may display the size-changed icon 523, which has belonged to the non-overlapping area 410, together with the size-changed icon 524, which has been on the right side of the non-overlapping area 410, in the outer right side of the non-overlapping area 410. In addition, in reducing the size of the upper GUI object, the icon to be reduced may be selected based on the properties information of the upper GUI object. For example, among the icons to be reduced, the icons may be reduced in the size in an order of the usage frequency of the icon (or a function of the corresponding icon). For example, the less the icon is used, the more the size thereof may be reduced, whereas the icon, which is frequently used, remains its original size. The properties information on the icon may include information on the icon area to be displayed in the screen, and the icon color as well as the usage frequency. For example, according to an embodiment of the present disclosure, the icons located outside the non-overlapping area 410 may be reduced in their size, and the icon 523, which has overlapped the non-overlapping area 410, may be relocated while maintaining the size thereof.

According to an embodiment of the present disclosure, FIG. 5C illustrates the operation of moving the icons displayed in the non-overlapping area 410 to the outside of the non-overlapping area 410. Diagram 540 of FIG. 5C illustrates that the icons 531 and 532 are displayed to overlap the non-overlapping area 410. In this case, the controller 150 may relocate the icons 531 and 532 to certain positions outside the non-overlapping area 410. Diagram 550 illustrates that the controller 150 has relocated the icons 531 and 532. As the icons 531 and 532 moves to the positions outside the non-overlapping area 410, the icons near the positions may be moved as well. In addition, according to an embodiment of the present disclosure, in relocating the icons that exist in the non-overlapping area 410, the controller 150 may consider the colors of the icons and the lower GUI object, and additional GUI factors (e.g., shapes). For example, when relocating the icon in the non-overlapping area 410, the controller 150 may relocate the icon to the position of which the color is close to the complementary color of the icon. According to this, the controller 150 may dispose the upper GUI object in the prominent position for the user.

In addition, according to an embodiment of the present disclosure, although the functions in the various embodiments of FIGS. 5A, 5B, and 5C are executed separately from each other, the functions can be simultaneously executed.

Figure 5D:
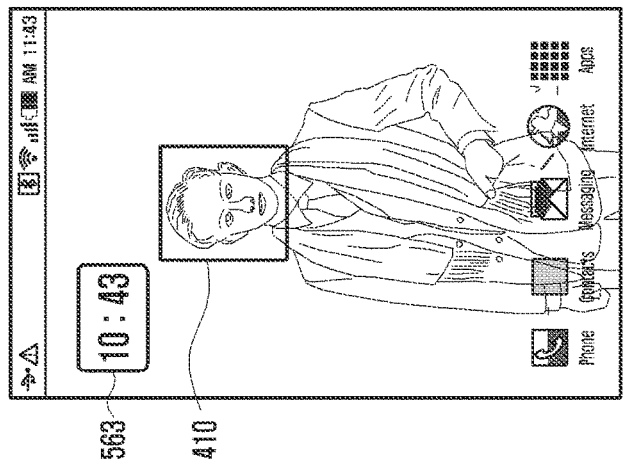
Figure 5D:
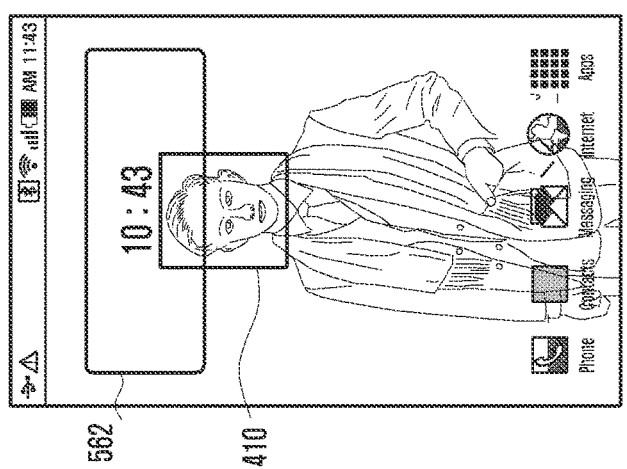

According to an embodiment of the present disclosure, FIG. 5D illustrates the operation in which the widget of the upper GUI objects displayed in the non-overlapping area 410 is changed in its configuration to be thereby displayed outside the non-overlapping area 410. The controller 150 may perform the operation of relocating various widgets as well as the icons in the non-overlapping area 410 to the outside of the non-overlapping area 410. Referring to diagram 560 of FIG. 5D, the widget 562 is displayed to overlap the non-overlapping area 410 in part. In this case, the controller 150 may recognize the widget 562 displayed to overlap the non-overlapping area 410, and may change the format of the widget 563 (e.g., change the size of 5×1 into the size of 2×1) to thereby display the same not to overlap the non-overlapping area 410 as shown in diagram 570. In addition, the operation of changing the widget display may include adjusting of the size, and transforming of the widget into the icon as well as the relocating of the widget.

Now, according to an embodiment of the present disclosure, the method of changing the display configuration of the upper GUI objects (e.g., icons) in the case of a plurality of non-overlapping areas will be described.

Referring to FIG. 6A, the operation of relocating the icons in the case of a plurality of non-overlapping areas is illustrated. Referring to diagram 610 of FIG. 6A, the first non-overlapping area 611 and the second non-overlapping area 612 may exist on the lower GUI object. In addition, a plurality of icons is displayed on the non-overlapping areas 611 and 612. Among the icons, the icon 613, which is displayed to overlap the first non-overlapping area 611, and the icon 614, which is displayed to overlap the second non-overlapping area 612, may be relocated under the control of the controller 150 as shown in diagram 620. Referring to diagram 620, the icons 613 and 614 may be relocated to the farthest positions from the non-overlapping areas 611 and 612. As mentioned above, the controller 150 may change the display configuration of the plurality of upper GUI objects.

In the embodiment above, in the case of a plurality of non-overlapping areas, the relocation of the upper GUI objects is conducted without combining the non-overlapping areas. According to another embodiment of the present disclosure, the controller 150 may combine two or more non-overlapping areas. This will be described hereinafter with reference to FIG. 6B.

Referring to FIG. 6B, the operation of combining two or more non-overlapping areas to create a new non-overlapping area is illustrated. Diagram 630 illustrates that the first non-overlapping area 611 and the second non-overlapping area 612 are combined to form the new third non-overlapping area 641. For example, the third non-overlapping area 641 may be created when the distance between the first non-overlapping area 611 and the second non-overlapping area 612 is within a reference distance. Alternatively, the third non-overlapping area 641 may be formed by combining the non-overlapping areas that are selected by the user, according to an embodiment of the present disclosure. Furthermore, the non-overlapping area may be combined in various ways. The icons 642, 643, and 644, which belong to the third non-overlapping area 641 newly created, may be relocated to the outside of the third non-overlapping area 641 under the control of the controller 150 as shown in diagram 640. As shown in diagrams 630 and 640, the icons 642, 643, and 644 may be moved to the positions near the third non-overlapping area 641.

Furthermore, according to an embodiment of the present disclosure, although it is not shown in the drawing, the controller 150 may perform the operation of deleting some of the icons displayed in the screen as a method of relocating the upper GUI objects. In the deleting of the icons, the icons may be deleted based on the priority for deletion, by which the icon that is not frequently used may be preferentially deleted.

In addition, according to an embodiment of the present disclosure, although the functions in the various embodiments of FIGS. 6A and 6B are executed separately from each other, the functions can be simultaneously executed.

According to an embodiment of the present disclosure, in addition to the still image, when the background image is comprised of a plurality of pages, the controller 150 may display the non-overlapping area and the icons not to overlap each other while moving on between the pages. The operation of moving on between the pages in the background image will be described with reference to FIGS. 7A and 7B.

According to an embodiment of the present disclosure, diagram 710 of FIG. 7A illustrates four icons 711, 712, 713, and 714 arranged in the outer right side of the non-overlapping area 410. In addition, diagram 710 illustrates the first page among four pages constituting the background image. At this time, as the user moves the page to the left as shown in diagram 710, the icons 711, 712, 713, and 714 moves to the left as well. In this case, the controller 150, according to an embodiment of the present disclosure, may change the display position of the icons 711 and 712 that are expected to be displayed to overlap the non-overlapping area 410, among the moving icons, as shown in diagram 720. As the page continues to move, the screen may be shown as diagram 730. In diagram 730, the icons 711 and 713 are displayed in the outer upper side of the non-overlapping area 410, and the icons 712 and 714 are displayed in the outer lower side of the non-overlapping area 410. Referring to diagram 740, as the background image continues to move to the left, the icons 711 and 712 return to the original positions. In addition, the icons 713 and 714 are displayed at the relocated positions, avoiding the non-overlapping area 410 in diagram 740. As described above, if the icons pass through the non-overlapping area 410 when moving the pages, the controller 150 may let the icons make a detour around the non-overlapping area 410. For example, the detouring of the icons around the non-overlapping area 410 may involve various animations.

According to an embodiment of the present disclosure, FIG. 7B illustrates that the non-overlapping area is newly configured when moving on between the pages. Diagram 750 illustrates that the icons 753 are arranged in the outside of the non-overlapping area 751. At this time, as the upper GUI objects are moved according to the movement of the page, the non-overlapping area 751 may be newly configured. Referring to diagram 760, a new non-overlapping area 752 is created to be different from the initial non-overlapping area 751. For example, the new non-overlapping area 752 may have a horizontal length identical to the total length of the screen, and a vertical length more than the vertical length of the initial non-overlapping area 751. If the pages and the icons 753 move up and down rather than to the left and right, the new non-overlapping area may have a vertical length identical to the total length of the screen. In addition, when moving the pages of the background image, as shown in diagrams 760 and 770, the icons 753 may be displayed outside the new non-overlapping area 752. Therefore, in this case, the controller 150 may not perform the operation (animation) of moving the GUI objects according to the movement of the pages, and may create a new non-overlapping area that has the same length as one of the horizontal length or the vertical length of the screen.

In the various embodiments of FIGS. 6A to 7B, when the GUI objects are displayed to overlap the non-overlapping area, the method for changing the display configuration of the upper GUI object was described. However, according to an embodiment of the present disclosure, in the case where the upper GUI objects are displayed to overlap the non-overlapping area in part, the controller 150 may change the display configuration of the lower GUI object. The method of changing the display configuration of the lower GUI object, for example, may include reducing the size of the background image, moving the lower GUI object (not shown), or creating an empty page displaying only the lower GUI object (not shown).

Hereinafter, the operation of changing the display configuration of the lower GUI object will be described with reference to FIG. 7C.

According to an embodiment of the present disclosure, diagram 780 illustrates that the lower GUI object where the non-overlapping area 410 exist, and the icons arranged at a constant interval. In diagram 780, the controller 150 may detect that the icons are displayed to overlap the non-overlapping area 410. In this case, the controller 150 may change the configuration of the lower GUI object (the background image) so that the icons do not overlap the non-overlapping area 410. The controller 150 may reduce the size of the non-overlapping area together with the background image as shown in diagram 790. In addition, the controller 150 may dispose the reduced non-overlapping area between the arranged icons so that the icons and the non-overlapping area 410 do not overlap each other. As describe above, the controller 150 may change the display configuration of the lower GUI object so that the upper GUI objects and the non-overlapping area 410 do not overlap each other. For example, when it is detected that the icons exist in the non-overlapping area 410, the controller 150 may change the configuration of the background image by arranging the background image in the center, arranging the background image in a lattice form, or reducing and relocating the background image based on the icons.

As described above, the displaying method, according to an embodiment of the present disclosure, may include detecting a non-overlapping area in a lower GUI object, determining whether upper GUI objects are displayed to overlap the non-overlapping area, and changing, if the upper GUI objects are displayed to overlap the non-overlapping area at least in part, the display configuration of at least one of the GUI objects.

Figure 8:
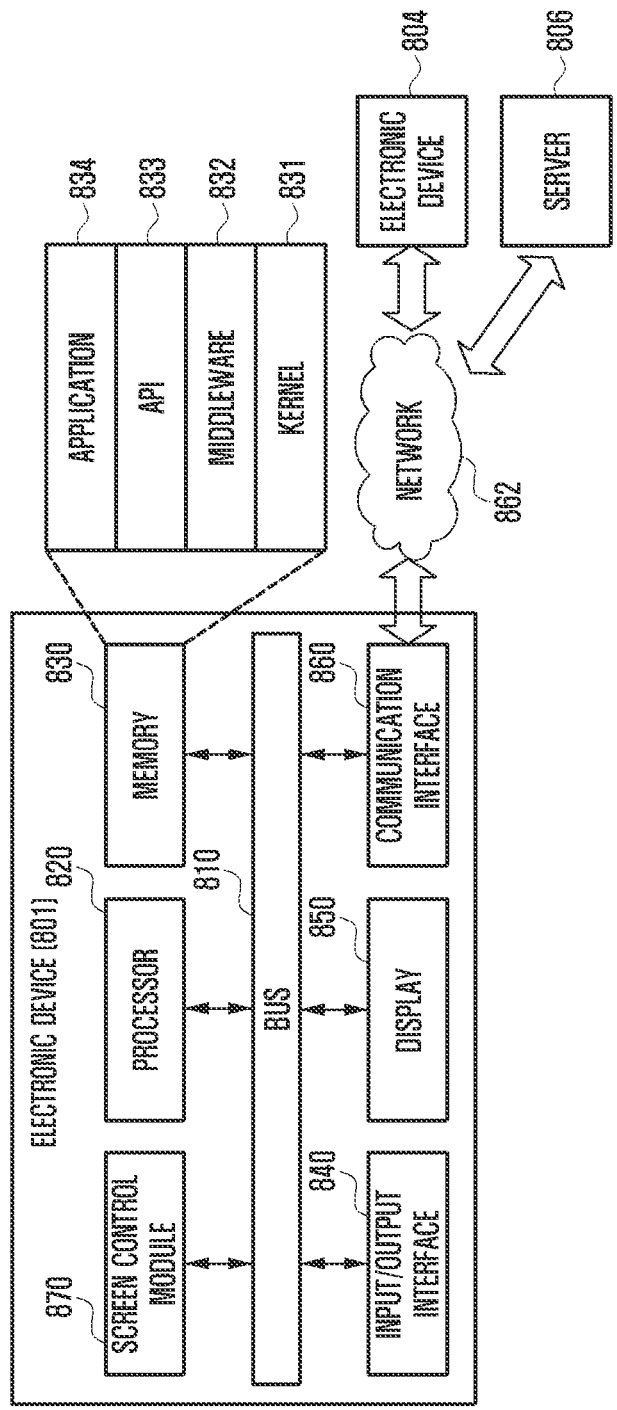
FIG. 8 illustrates a network environment including an electronic device according to various embodiments of the present disclosure.

FIG. 8 illustrates a network environment including an electronic device according to various embodiments of the present disclosure.

Referring to FIG. 8, an electronic device 801 may include a bus 810, a processor 820, a memory 830, an input/output interface 840, a display 850, a communication interface 860, and a screen control module 870.

The bus 810 may be a circuitry which connects the aforementioned components to each other to communicate signals (e.g., control messages) therebetween.

The processor 820 receives a command from any of the aforementioned components (e.g., the memory 830, the input/output interface 840, the display 850, the communication interface 860, and the screen control module 870) through the bus 810, interprets the command, and executes operation or data processing according to the decrypted command.

The memory 830 may store the command or data received from the processor 820 or other components (e.g., the input/output interface 840, the display 850, the communication interface 860, the screen control module 870, and the like) or generated by the processor 820 or other components. The memory 830 may store program modules including kernel 831, middleware 832, application programming interface (API) 833, applications 834, and the like. Each programming module may be implemented as software, firmware, hardware, and any combination thereof.

The kernel 831 may control or manage the system resources (e.g., the bus 810, the processor 820, and the memory 830) for use in executing the operation or function implemented with the middleware 832, the API 833, or the application 834. The kernel 831 also may provide an interface allowing the middleware 832, API 833, or application 834 to access the components of the electronic device 801 to control or manage.

The middleware 832 may work as a relay of data communicated between the API 833 or application 834 and the kernel 131. The middleware 832 may execute control of the task requests from the applications 834 in such a way of assigning priority for use of the system resource (e.g., the bus 810, the processor 820, and the memory 830) of the electronic device to at least one of the applications 834.

The API 833 is the interface for the applications 834 to control the function provided by the kernel 831 or the middleware 832 and may include at least one interface or function (e.g., a command) for file control, window control, image control, or text control.

According to various embodiments of the present disclosure, the applications 834 may include a short message service (SMS)/multimedia messaging service (MMS) application, an email application, a calendar application, an alarm application, a healthcare application (e.g., an application of measuring quantity of motion or blood sugar level), and an environmental information application (e.g., atmospheric pressure, humidity, and temperature applications). Additionally or alternatively, the application 834 may be an application related to information exchange between the electronic device 801 and other external electronic device (e.g., an external electronic device 804). Examples of the information exchange application may include a notification relay application for relaying specific information to the external electronic device 804 and a device management application for managing the external electronic device.

For example, the notification relay application may be provided with a function of relaying the alarm information generated by the other applications (e.g., an SMS/MMS application, an email application, a healthcare application, and an environmental information application) of the electronic device to an external electronic device (e.g., the external electronic device 804). Additionally or alternatively, the notification relay application may provide the user with the notification information received from an external electronic device (e.g., the external electronic device 804). The electronic device application may manage (e.g., install, delete, and update) the function of an external electronic device (e.g., turn-on/off of the external electronic device 804 itself (or a part of it) or adjustment of the brightness (or resolution) of the display) which communicates with the electronic device 101 or the service (e.g., a communication or messaging service) provided by the external electronic device or an application running on the external device.

According to various embodiments of the present disclosure, the applications 834 may include an application designated according to the property (e.g., a type) of an external electronic device (e.g., the external electronic device 804). If the external electronic device is the MP3 player, the applications 834 may include a music playback application. Similarly, if the external electronic device is a mobile medical appliance, the applications 834 may include a heal care application. According to an embodiment of the present disclosure, the application 834 may include at least one of applications designated to the electronic device 801 or the applications received from the external electronic device (e.g., a server 806 and the external electronic device 804).

The input/output interface 840 delivers the command or data input by the user through with an input/output device (e.g., a sensor, a keyboard, and a touchscreen) to the processor 820, memory 830, communication interface 860, and/or screen control module 870 through the bus 810. For example, the input/output interface 840 may provide the processor 820 with the data corresponding to the touch may by the user on the touchscreen. The input/output interface 840 may output the command or data (which is received from the processor 820, memory 830, communication interfaced 860, or the screen control module 870 through the bus 810) through the input/output device (e.g., a speaker and a display). For example, the input/out interface 840 may output the voice data processed by the processor 820 to the user through the speaker.

The display 850 may present various information (e.g., multimedia data and text data) to the user.

The communication interface 860 may establish a communication connection of the electronic device 801 with an external device (e.g., the external electronic device 804 and the server 806). For example, the communication interface 860 connects to a network 862 through a wireless or wired link for communication with the external device. Examples of the wireless communication technology may include wireless fidelity (Wi-Fi), bluetooth (BT), near field communication (NFC), GPS, and cellular communication technology (e.g., long term evolution (LTE), LTE-advanced (LTE-A), code division multiple access (CDMA), wideband CDMA (WCDMA), universal mobile telecommunication system (UMTS), wireless-broadband (WiBro), and global system for mobile communications (GSM)). Examples of the wired communication technology may include universal serial bus (USB), high definition multimedia interface (HDMI), recommended standard 232 (RS-232), and plain old telephone service (POTS).

According to an embodiment of the present disclosure, the network 862 may be a telecommunication network. The communication network may include at least one of computer network, Internet, Internet of Things, and telephone network. According to an embodiment of the present disclosure, the communication protocol between the electronic device 801 and an external device (e.g., a transport layer protocol, a data link layer protocol, and a physical layer protocol) may be supported by at least one of the applications 834, API 833, middleware 832, kernel 831, and communication interface 860.

The screen control module 870 may process at least some of information obtained from other elements (e.g., the processor 820, the memory 830, the input/output interface 840, a communication interface 860, and the like), and may provide the same to the user in various ways. For example, the screen control module 870 may control the position where the GUI object is to be displayed, based on information on the non-overlapping area, which is recorded in the memory 830, so that the GUI object is displayed not to overlap the non-overlapping area.

Figure 9:
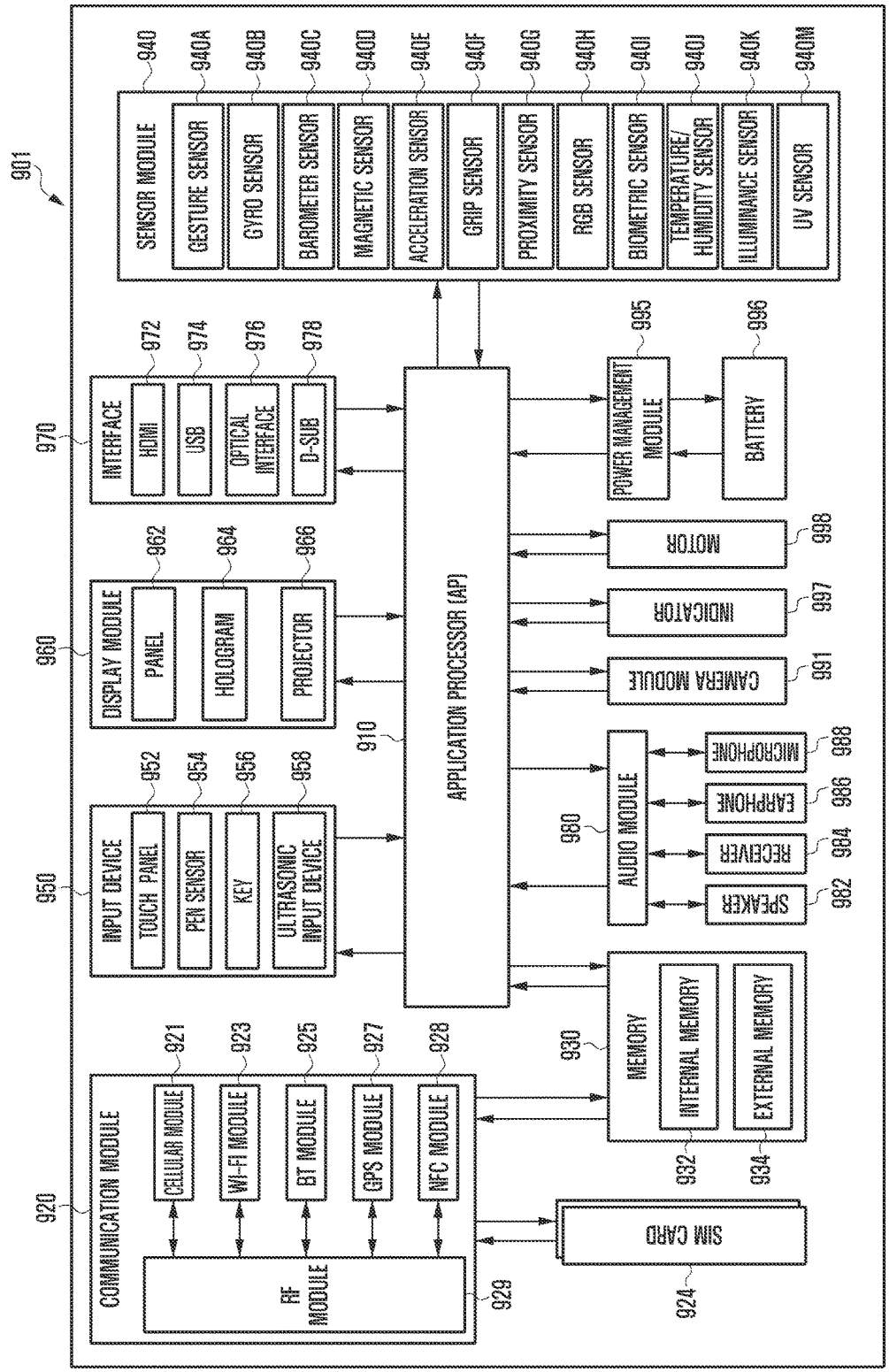
FIG. 9 is a block diagram of an electronic device according to various embodiments of the present disclosure.

FIG. 9 is a block diagram illustrating a configuration of an electronic device according to various embodiments of the present disclosure. The electronic device of FIG. 9 may be of the whole or a part of the electronic device 101.

Referring to FIG. 9, an electronic device 901 may include an application processor (AP) 910, a communication module 920, a subscriber identity module (SIM) card 924, a memory 930, a sensor module 940, an input device 950, a display module 960, an interface 970, an audio module 980, a camera module 991, a power management module 995, a battery 996, an indicator 997, and a motor 998.

The AP 910 may operate an operating system (OS) and/or application programs to control a plurality of hardware and/or software components connected to the AP 910 and perform data-processing and operations on multimedia data. For example, the AP 910 may be implemented in the form of a system on chip (SoC). According to an embodiment of the present disclosure, the AP 910 may include a graphic processing unit (GPU) (not shown).

The communication module 920 (e.g., the communication interface 160) may perform data communication with other electronic devices (e.g., the electronic device 104 and the server 106) through a network. According to an embodiment of the present disclosure, the communication module 920 may include a cellular module 921, a Wi-Fi module 923, a BT module 925, a GPS module 927, an NFC module 928, and a radio frequency (RF) module 929.

The cellular module 921 is responsible for voice and video communication, text messaging, and Internet access services through a communication network (e.g., LTE, LTE-A, CDMA, WCDMA, UMTS, WiBro, and GSM networks). The cellular module 921 may perform identification and authentication of electronic devices in the communication network using the SIM card 924. According to an embodiment of the present disclosure, the cellular module 921 may perform at least one of the functions of the AP 910. For example, the cellular module 921 may perform at least a part of the multimedia control function.

According to an embodiment of the present disclosure, the cellular module 921 may include a communication processor (CP). The cellular module 921 may be implemented in the form of SOC. Although the cellular module 921 (e.g., a communication processor), the memory 930, and the power management module 995 are depicted as independent components separated from the AP 910, the present disclosure is not limited thereto but may be embodied in a way that the AP includes at least one of the components (e.g., the cellular module 921).

According to an embodiment of the present disclosure, each of the AP 910 and the cellular module 921 (e.g., a communication processor) may load a command or data received from at least one of the components on a non-volatile or volatile memory and process the command or data. The AP 910 or the cellular module 921 may store the data received from other components or generated by at least one of other components in the non-volatile memory.

Each of the Wi-Fi module 923, the BT module 925, the GPS module 927, and the NFC module 928 may include a processor for processing the data each of the Wi-Fi module 923, the BT module 925, the GPS module 927, and the NFC module 928 transmits/receives. Although the cellular module 921, the Wi-Fi module 923, the BT module 925, the GPS module 927, and the NFC module 928 are depicted as independent blocks, at least two of them (e.g., a communication processor corresponding to the cellular module 921 and Wi-Fi processor corresponding to the Wi-Fi module 923) may be integrated in the form of an SoC.

The RF module 929 is responsible for data communication, e.g., transmitting/receiving RF signals. Although not depicted, the RF module 929 may include a transceiver, a power amp module (PAM), a frequency filter, and a low noise amplifier (LNA). The RF module 929 also may include the elements for transmitting/receiving electric wave in free space, e.g., conductor or conductive wire. Although FIG. 9 is directed to the case where the Wi-Fi module 923, the BT module 925, the GPS module 927, and the NFC module 928 are sharing the RF module 929, the present disclosure is not limited thereto but may be embodied in a way that at least one of the Wi-Fi module 923, the BT module 925, the GPS module 927, and the NFC module 928 transmits/receives RF signals an independent RF module.

The SIM card 924 may be designed so as to be inserted into a slot formed at a certain position of the electronic device. The SIM card 924 may store unique identity information (e.g., integrated circuit card identifier (ICCID)) or subscriber information (e.g., international mobile subscriber identity (IMSI)).

The memory 930 (e.g., the memory 130) may include at least one of an internal memory 932 and an external memory 934. The internal memory 932 may include at least one of a volatile memory (e.g., a dynamic random access memory (DRAM), a static RAM (SRAM), a synchronous dynamic RAM (SDRAM) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, not and (NAND) flash memory, and not or (NOR) flash memory)

According to an embodiment of the present disclosure, the internal memory 932 may be a solid state drive (SSD). The external memory 934 may be a flash drive, such as compact flash (CF), secure digital (SD), micro-SD, Mini-SD, extreme digital (xD), and Memory Stick. The external memory 934 may be connected to the electronic device 901 through various interfaces functionally. According to an embodiment of the present disclosure, the electronic device 901 may include a storage device (or storage medium), such as a hard drive.

The sensor module 940 may measure physical quantity or determine the operation status of the electronic device 901 and convert the measured or determined information to an electric signal. The sensor module 940 may include at least one of a gesture sensor 940A, a Gyro sensor 940B, an atmospheric pressure sensor 940C, a magnetic sensor 940D, an acceleration sensor 940E, a grip sensor 940F, a proximity sensor 940G, a color sensor 940H (e.g., red, green, blue (RGB) sensor), a bio sensor 940I, a temperature/humidity sensor 940J, an illuminance sensor 940K, and an ultraviolet (UV) sensor 940M. Additionally or alternatively, the sensor module 940 may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and a fingerprint sensor (not shown). The sensor module 940 may further include a control circuit for controlling at least one of the sensors included therein.

The input device 950 may include a touch panel 952, a (digital) pen sensor 954, keys 956, and an ultrasonic input device 958. The touch panel 952 may be one of capacitive, resistive, infrared, microwave type touch panel. The touch panel 952 may include a control circuit. In the case of the capacitive type touch panel, it is possible to detect physical contact or approximation. The touch panel 952 may further include a tactile layer. In this case, the touch panel 952 may provide the user with haptic reaction.

The (digital) pen sensor 954 may be implemented with a sheet with the same or similar way as touch input of the user or a separate recognition sheet. The keys 956 may include physical buttons, an optical key, and a keypad. The ultrasonic input device 958 is a device capable of determining data by detecting sound wave through a microphone 988 and may be implemented for wireless recognition. According to an embodiment of the present disclosure, the electronic device 901 may receive the user input made by means of an external device (e.g., a computer or a server) connected through the communication module 920.

The display module 960 (e.g., the display unit 120) may include a panel 962, a hologram device 964, and a projector 966. The panel 962 may be a LCD panel or an AMOLED panel. The panel 962 may be implemented so as to be flexible, transparent, and/or wearable. The panel 962 may be implemented as a module integrated with the touch panel 952. The hologram device 964 may present 3-dimentional image in the air using interference of light. The projector 966 may project an image to a screen. The screen may be placed inside or outside the electronic device. According to an embodiment of the present disclosure, the display module 960 may include a control circuit for controlling the panel 962, the hologram device 964, and the projector 966.

The interface 970 may include an HDMI 972, a USB 974, an optical interface 976, and a D-subminiature (D-sub) 978. The interface 970 may include the communication interface 160 as shown in FIG. 1. Additionally or alternatively, the interface 970 may include a mobile high-definition link (MHL) interface, an SD/multimedia card (MMC) card interface, and an infrared data association (irDA) standard interface.

The audio module 980 may convert sound to electric signal and vice versa. At least a part of the audio module 980 may be included in the input/output interface 840 as shown in FIG. 8. The audio module 980 may process the audio information input or output through a speaker 982, a receiver 984, an earphone 986, and the microphone 988.

The camera module 991 is a device capable of taking still and motion pictures and, according to an embodiment of the present disclosure, includes at least one image sensor (e.g., front and rear sensors), a lens (not shown), and image signal processor (ISP) (not shown), and a flash (e.g., LED or xenon lamp) (not shown).

The power management module 995 may manage the power of the electronic device 901. Although not shown, the power management module 995 may include a power management integrated circuit (PMIC), a charger IC, a battery, and a battery or fuel gauge.

The PMIC may be integrated into an integrated circuit or an SoC semiconductor. The charging may be classified into wireless charging and wired charge. The charger IC may charge the battery and protect the charger against overvoltage or overcurrent. According to an embodiment of the present disclosure, the charger IC may include at least one of wired charger and wireless charger ICs. Examples of the wireless charging technology includes resonance wireless charging and electromagnetic wave wireless charging, and there is a need of extra circuit for wireless charging, such as coil loop, resonance circuit, and diode.

The battery gauge may measure the residual power of the battery 996, charging voltage, current, and temperature. The battery 996 may store or generate power and supply the stored or generated power to the electronic device 901. The battery 996 may include a rechargeable battery or a solar battery.

The indicator 997 may display operation status of the electronic device 901 or a part of the electronic device, booting status, messaging status, and charging status. The motor 998 may converts the electronic signal to mechanical vibration. Although not shown, the electronic device 901 may include a processing unit (e.g., a GPU) for supporting mobile TV. The processing unit for supporting the mobile TV may be able to processing the media data abiding by the broadcast standards, such as digital multimedia broadcasting (DMB), digital video broadcasting (DVB), and media flow.

The term "module" according to various embodiments of the present disclosure, indicates, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of an application-specific IC (ASIC) chip, field-programmable gate arrays (FPGAs), and a programmable-logic device known or to be developed for certain operations.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a recording medium stores instructions which are configured to allow at least one processor to execute at least one operation when at least one instruction is executed by at least one processor, and the at least one operation may include detecting a non-overlapping area in a lower GUI object, determining whether upper GUI objects are displayed to overlap the non-overlapping area, and changing, if the upper GUI objects are displayed to overlap the non-overlapping area at least in part, the display configuration of at least one of the GUI objects.

In addition, an electronic device, according to various embodiments of the present disclosure, may include a display unit configured to display a lower GUI object and upper GUI objects, and a controller configured to detect a non-overlapping area from the lower GUI object, determine whether the upper GUI objects are displayed to overlap the non-overlapping area, and change, if the upper GUI objects are displayed to overlap the non-overlapping area at least in part, the display configuration of at least one of the GUI objects.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A displaying method comprising:
   detecting an area prevented from being overlapped in a lower graphical user interface (GUI) object that is displayed lower than upper GUI objects with respect to a Z-plane;
   determining whether the upper GUI objects are displayed to overlap the area; and
   changing, if the upper GUI objects are displayed to overlap the area at least in part, a display configuration of at least one of the GUI objects,
   wherein the changing of the display configuration comprises changing the display configuration of the upper GUI objects so that the upper GUI objects and the area are displayed not to overlap each other,
   wherein the changing of the display configuration of the upper GUI objects comprises grouping the upper GUI objects into a folder and displaying the folder outside the area prevented from being overlapped, and
   wherein, when the upper GUI objects overlap at least a part of the lower GUI object, displaying the lower GUI object to be discernible by grouping the upper GUI objects into a category having identical property information.

2. The method of claim 1, wherein the upper GUI objects are displayed in an upper layer of a screen, and comprise at least one of an icon or a widget.

3. The method of claim 1, wherein the lower GUI object is displayed in a lower layer of a screen, and comprises at least one of a background image, a background video, or an application execution image.

4. The method of claim 1,
wherein the changing of the display configuration comprises changing the display configuration of the lower GUI object so that the area and the upper GUI objects are displayed not to overlap each other, and
wherein the changing of the display configuration of the lower GUI object comprises at least one of:
changing the size of the lower GUI object;
changing the position of the lower GUI object;
changing the shape of the lower GUI object; or
creating an empty page comprised of the lower GUI object.

5. The method of claim 1, wherein the changing of the display configuration of the upper GUI objects further comprises at least one of relocating the upper GUI objects, changing the size of the upper GUI objects, or deleting the upper GUI objects.

6. The method of claim 5, wherein the changing of the display configuration of the upper GUI objects is performed based on at least one of properties information of an application corresponding to the upper GUI objects or image properties of the upper GUI objects.

7. The method of claim 6, wherein the properties information comprises at least one of usage frequency, capacity, creation date, or category of the application, and the image properties includes at least one of colors, positions, or sorting priority.

8. The method of claim 5, wherein, in the relocating of the upper GUI objects, the upper GUI objects are relocated to a position of which a color is close to a complementary color of the upper GUI objects, based on image properties of the upper GUI objects.

9. The method of claim 5, wherein the relocating of the upper GUI objects comprises performing an animation when relocating the upper GUI objects.

10. The method of claim 5, wherein the relocating of the upper GUI objects comprises, when the upper GUI objects are moved according to a movement of a page, reconfiguring area including a movement range of the upper GUI objects.

11. The method of claim 1, wherein the detecting of the area comprises, in a case of a plurality of areas being prevented from being overlapped, creating a new area that is prevented from being overlapped and includes two or more areas, which are adjacent to each other.

12. An electronic device comprising:
a display configured to display a lower graphical user interface (GUI) object lower than displayed upper GUI objects with respect to a Z-plane; and
at least one processor configured to:
detect an area prevented from being overlapped from the lower GUI object,
determine whether the upper GUI objects are displayed to overlap the area,
change, if the upper GUI objects are displayed to overlap the area at least in part, a display configuration of at least one of the GUI objects,
change the display configuration of the upper GUI objects so that the upper GUI objects and the area are displayed not to overlap each other, and
perform, by changing the display configuration, a grouping of the upper GUI objects into a folder and display the folder outside the area prevented from being overlapped,
wherein the at least one processor, when the upper GUI objects overlap at least a part of the lower GUI object, displays the lower GUI object to be discernible by grouping the upper GUI objects into a category having identical property information.

13. The electronic device of claim 12, wherein the at least one processor is further configured to:
change the display configuration of the lower GUI object so that the area and the upper GUI objects are displayed not to overlap each other, and
change, in changing the display configuration, the size, the position, or the shape of the lower GUI object, or create an empty page comprised of the lower GUI object.

14. The electronic device of claim 12, wherein the at least one processor is further configured to perform, in changing the display configuration, at least one of relocating the upper GUI objects, changing a size of the upper GUI objects, or deleting the upper GUI objects.

15. The electronic device of claim 14, wherein the at least one processor is further configured to change the display configuration of the upper GUI objects based on at least one of properties information of an application corresponding to the upper GUI objects or image properties of the upper GUI objects.

16. The electronic device of claim 14, wherein the at least one processor is further configured to, in relocating the upper GUI objects based on image properties thereof, relocate the upper GUI objects to a position of which a color is close to a complementary color of the upper GUI objects.

17. The electronic device of claim 14, wherein the at least one processor is further configured to perform an animation when relocating the upper GUI objects.

18. The electronic device of claim 14, wherein the at least one processor is further configured to, when the upper GUI objects are moved according to a movement of a page, reconfigure the area including a movement range of the upper GUI objects.

19. The electronic device of claim 14, wherein, in deleting the upper GUI objects, the at least one processor is further configured to:
determine a priority for deletion based on a usage frequency, and
delete the upper GUI objects according to the priority for deletion.

20. The electronic device of claim 12, wherein, in detecting the area, the at least one processor is further configured to, in a case of a plurality of areas being prevented from being overlapped, create a new area that is prevented from being overlapped and includes two or more areas, which are adjacent to each other.

* * * * *